United States Patent

Versaw et al.

[15] 3,693,880
[45] Sept. 26, 1972

[54] INFRARED SUPPRESSOR MEANS

[72] Inventors: Edward F. Versaw, La Canada; Herbert C. Moe, Los Angeles; Jerry L. Reed, China Lake, all of Calif.

[73] Assignee: The United States of America as represented by the Secretary of the Navy

[22] Filed: Nov. 2, 1970

[21] Appl. No.: 90,208

[52] U.S. Cl. ............ 239/127.3, 239/265.19, 60/271
[51] Int. Cl. ................................................. B64d 33/04
[58] Field of Search ........... 239/127.1, 127.3; 60/271

[56] References Cited

UNITED STATES PATENTS 3,210,934 10/1965 Smale .......................... 60/265
3,332,243 7/1967 Wilson .......................... 60/271

Primary Examiner—Samuel Feinberg
Attorney—R. S. Sciascia, Roy Miller and Gerald F. Baker

[57] ABSTRACT

An air-cooled contoured plug fitted within the exhaust pipe of a gas turbine engine is designed also for use with an afterburning turbojet type having variable position nozzle leaves. The plug is large enough in diameter to hide from view hot engine parts forward of the plug, such as the turbine wheel, exhaust cone, flameholders, and the exhaust pipe wall. By reducing the intensity of radiation from a turbojet engine when operating in non-afterburning power, the detection of a turbojet-powered aircraft by a heat-seeking missile is minimized.

2 Claims, 2 Drawing Figures

PATENTED SEP 26 1972 3,693,880

INVENTORS.
EDWARD F. VERSAW
HERBERT C. MOE
JERRY L. REED

BY ROY MILLER
ATTORNEY.
GERALD F. BAKER
AGENT.

INFRARED SUPPRESSOR MEANS

BACKGROUND OF THE INVENTION

With the introduction of heat-seeking missiles it became necessary to take steps to evade such missiles. Various shields and plugs have been devised to reduce or mask the radiation from engine exhausts to avoid detection of vehicles by the heat sensitive detectors of the heat-seeking missiles.

In prior devices using the film cooling or transpiration cooling method the cooling air was discharged ahead of the exit nozzle and a high air pressure source was required.

SUMMARY OF THE INVENTION

According to the present invention, a contoured plug large enough in diameter to hide hot engine parts such as the turbine wheel, exhaust cone, flame holders, etc., forward of the plug, is placed in the exhaust pipe of a turbojet engine. The plug comprises two half sections separated by a honeycomb heat shield and the aft half is air-cooled. In the present system the cooling air is exhausted downstream of the nozzle leaves and the convective cooling system used has the lowest plug surface temperatures for the least penalty to engine performance.

DETAILED DESCRIPTION OF THE INVENTION

Figure 1:
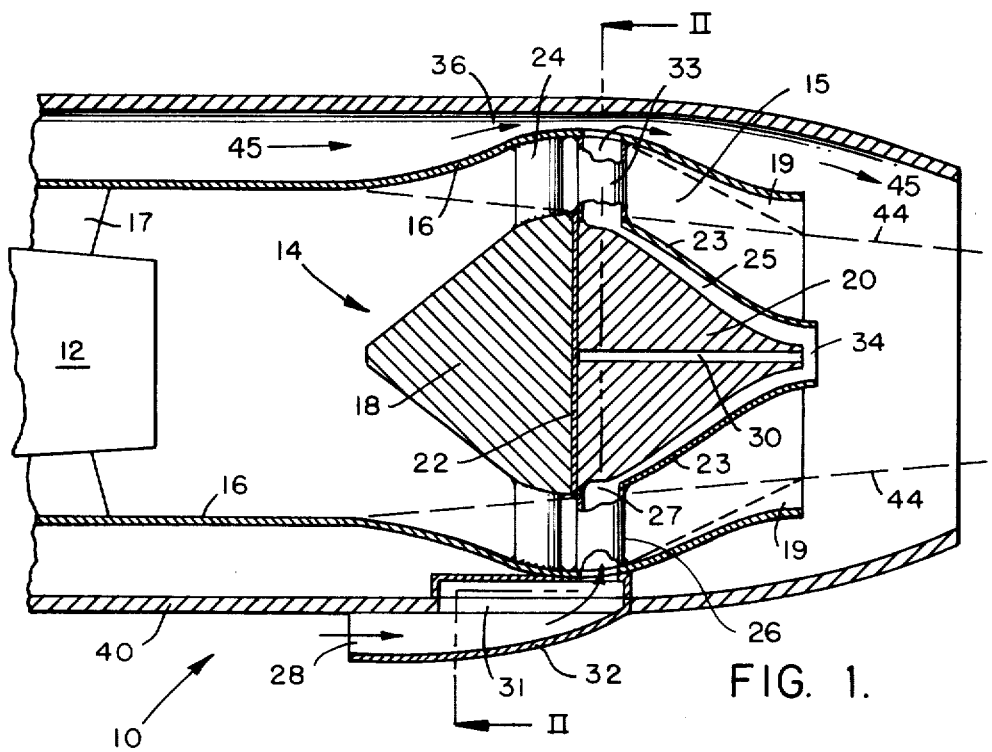
FIG. 1 is a longitudinal cross sectional view of the aft end of an aircraft fuselage with a plug installed according to the present invention.
Figure 2:
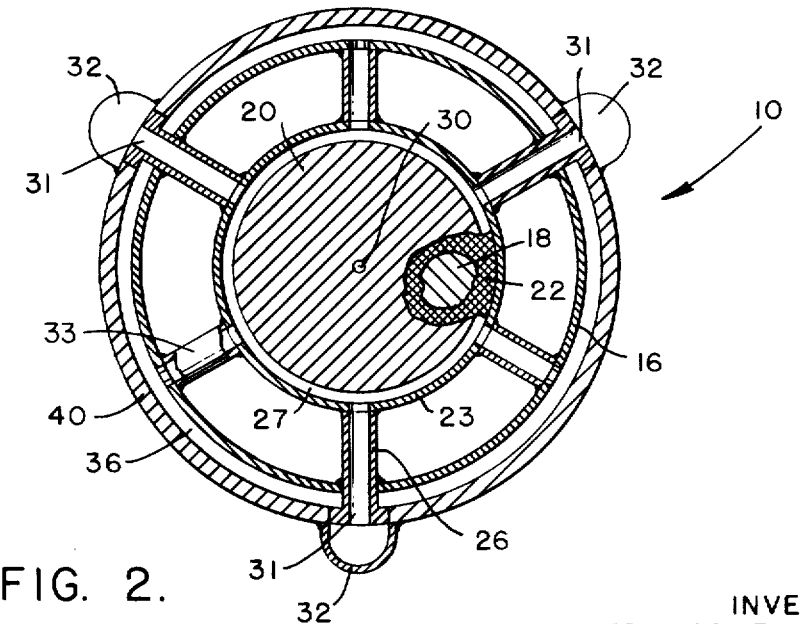
FIG. 2 is a cross sectional view taken along line 2—2 of FIG. 1.

In FIG. 1 the numeral 10 designates the aft end of an aircraft powered by an engine 12 and fitted with a countermeasures unit 14. The unit 14 is designed to fit into the exhaust pipe 16 which is fixed to engine 12 by struts 17. The unit 14 comprises a plug made in two halves, 18, 20. The front half 18 is conical in shape and the aft half 20 is contoured for isentropic expansion of the exhaust gas. The two halves are separated by a ¼-inch disc 22 comprising two sheets of stainless steel separated by a honeycomb core. This disc 22 acts as a radiation shield between the uncooled front half and the air-cooled after half. Both halves are supported by a number of airfoil shaped struts 24, 26 secured to the afterburner case of exhaust 16. The two halves are designed to fit closely when the engine is at operating temperature but to be spaced slightly apart when the engine is cold.

Any exhaust gas leaking into the forward plug half is vented overboard through a small tube 30 that connects the front plug compartment to the plug exit at the aft end. The aft plug half 20 receives cooling air through the three mounting struts 26 from ram air scoops 32 located on the airframe 40 over slots 31. The air is distributed through passageway 27 to annular passage 25 between plug half 20 and the outer casing 23. Three struts 33 mounted midway between struts 26 provide additional support to the aft plug 20 and are cooled by air passing outward through struts 33 discharging into the annular passage 36 where it mixes with engine cooling or bypass air 45.

Engine exhaust flows from the hump of the plug 14 rearward through the annular passage 15 formed between the outer casing 23 and the inner wall of exhaust pipe 16. The depth of passage increases as the plug decreases in diameter so that constant flow area is maintained. The plug is shortened in length to assure sufficient cooling air exit area 34 at the aft end of the plug.

For maximum reduction in infrared radiations from an engine fitted with the contoured plug device, the plug surface temperature must be kept low. By exhausting the cooling air downstream of the nozzle leaves 19, the maximum quantity of air can flow for the pressure available. The convective cooling system used in this plug design, thus, is the lowest plug surface temperature for the least penalty to engine performance.

To accommodate the plug and to retain the desired gas flow area, the engine tail pipe 16 is locally increased in diameter approximating the same hump shape as the plug 14 itself. The flow area is sized to be continuously decreasing from the plug front end to the nozzle end. This construction provides a favorable pressure gradient and prevents flow separation because of boundary layer buildup. The plug effectively hides hot engine parts from view as indicated by sight lines 44.

Another advantage of the plug is that it does not interfere with the operation of a fixed nozzle or a variable area nozzle since a slight adjustment of the nozzle opening easily compensates for the small area reduction at the center. Therefore, this device is also suitable for use with an afterburning turbojet engine that varies nozzle exit area with variable position nozzle leaves. In fact, the cooling air source that is used for cooling the hydraulic actuating equipment for the nozzle leaves may also be employed for cooling of the plug surface.

What is claimed is:

1. In a device for attenuating the radiation emitted from an engine exhaust pipe comprising a contoured plug fixed within and spaced from the walls of said exhaust pipe;
   means for cooling said walls and said plug;
   said plug being attached to said walls by means of hollow struts;
   said cooling means including means for causing air to be distributed around the after end of said plug through said hollow struts;
   the improvement comprising:
   said after end of said plug being separated from the forward portion of said plug by a heat shield; and
   said heat shield comprising a disc orthogonal to and substantially bisecting the longitudinal axis of said plug.

2. The device of claim 1 wherein said shield comprises two sheets of stainless steel separated by a honeycomb core.

* * * * *